(12) United States Patent
Hou et al.

(10) Patent No.: US 11,430,205 B2
(45) Date of Patent: Aug. 30, 2022

(54) METHOD AND APPARATUS FOR DETECTING SALIENT OBJECT IN IMAGE

(71) Applicant: Huawei Technologies Co., Ltd., Shenzhen (CN)

(72) Inventors: Qibin Hou, Tianjin (CN); Mingming Cheng, Tianjin (CN); Wei Bai, Beijing (CN); Xunyi Zhou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 16 days.

(21) Appl. No.: 16/723,539

(22) Filed: Dec. 20, 2019

(65) Prior Publication Data

US 2020/0143194 A1 May 7, 2020

Related U.S. Application Data

(63) Continuation of application No. PCT/CN2018/092514, filed on Jun. 22, 2018.

(30) Foreign Application Priority Data

Jun. 23, 2017 (CN) .......................... 201710488970.4

(51) Int. Cl.
*G06K 9/62* (2022.01)
*G06V 10/46* (2022.01)

(52) U.S. Cl.
CPC ......... *G06V 10/462* (2022.01); *G06K 9/6249* (2013.01); *G06K 9/6256* (2013.01); *G06V 2201/07* (2022.01)

(58) Field of Classification Search
CPC ...... G06K 9/46; G06K 9/4628; G06K 9/4671; G06K 9/6249; G06K 9/6256;
(Continued)

(56) References Cited

U.S. PATENT DOCUMENTS 5,361,291 A 11/1994 Toth et al.
2011/0058747 A1* 3/2011 Nakagomi .............. G06K 9/46
382/195
(Continued)

FOREIGN PATENT DOCUMENTS

CN 101329767 A 12/2008
CN 101520894 A 9/2009
(Continued)

OTHER PUBLICATIONS

T. Zhao and X. Wu, "Pyramid Feature Attention Network for Saliency Detection," 2019 IEEE/CVF Conference on Computer Vision and Pattern Recognition (CVPR), Long Beach, CA, USA, 2019, pp. 3080-3089, doi: 10.1109/CVPR.2019.00320. (Year: 2019).*
(Continued)

*Primary Examiner* — Leon Viet Q Nguyen
(74) *Attorney, Agent, or Firm* — Conley Rose, P.C.

(57) ABSTRACT

A method and an apparatus for detecting a salient object in an image includes separately performing convolution processing corresponding to at least two convolutional layers on a to-be-processed image to obtain at least two first feature maps of the to-be-processed image, performing superposition processing on at least two first feature maps included in a superposition set in at least two sets to obtain at least two second feature maps of the to-be-processed image, the at least two sets are in a one-to-one correspondence with the at least two second feature maps, and a resolution of a first feature map included in the superposition set is lower than or equal to a resolution of a second feature map corresponding to the superposition set, and splicing the at least two second feature maps to obtain a saliency map.

16 Claims, 8 Drawing Sheets

(58) Field of Classification Search
CPC .... G06K 9/6272; G06K 9/66; G06K 2209/21; G06N 3/08; G06T 5/10; G06T 5/50; G06T 7/00; G06T 7/12; G06T 2207/20081
See application file for complete search history.

(56) References Cited

U.S. PATENT DOCUMENTS

| | | |
|---|---|---|
| 2016/0358035 A1 | 12/2016 | Ruan et al. |
| 2020/0143194 A1 | 5/2020 | Hou et al. |

FOREIGN PATENT DOCUMENTS

| | | |
|---|---|---|
| CN | 101526955 A | 9/2009 |
| CN | 101650824 A | 2/2010 |
| CN | 102184557 B | 9/2012 |
| CN | 104463865 A | 3/2015 |
| CN | 104537393 A | 4/2015 |
| CN | 104680508 A | 6/2015 |
| CN | 104794504 A | 7/2015 |
| CN | 105590319 A | 5/2016 |
| CN | 105787482 A | 7/2016 |
| CN | 106127725 A | 11/2016 |
| CN | 106157319 A | 11/2016 |
| CN | 106296638 A | 1/2017 |
| CN | 106339984 A | 1/2017 |
| CN | 106600538 A | 4/2017 |
| WO | 2018233708 A1 | 12/2018 |

OTHER PUBLICATIONS

X. Wang, H. Ma, X. Chen and S. You, "Edge Preserving and Multi-Scale Contextual Neural Network for Salient Object Detection," in IEEE Transactions on Image Processing, vol. 27, No. 1, pp. 121-134, Jan. 2018, doi: 10.1109/TIP.2017.2756825. (Year: 2017).*
Zhang, Pingping, et al. "Amulet: Aggregating Multi-Level Convolutional Features for Salient Object Detection." ArXiv:1708.02001 [Cs], Aug. 2017. arXiv.org, http://arxiv.org/abs/1708.02001. (Year: 2017).*
M. M. I. Lie, G. B. Borba, H. V. Neto and H. R. Gamba, "Fast Saliency Detection Using Sparse Random Color Samples and Joint Upsampling," 2016 29th SIBGRAPI Conference on Graphics, Patterns and Images (SIBGRAPI), Sao Paulo, Brazil, 2016, pp. 217-224, doi: 10.1109/SIBGRAPI.2016.038. (Year: 2016).*
S. Xie and Z. Tu, "Holistically-Nested Edge Detection," 2015 IEEE International Conference on Computer Vision (ICCV), Santiago, Chile, 2015, pp. 1395-1403, doi: 10.1109/ICCV.2015.164. (Year: 2015).*
S. S. S. Kruthiventi, V. Gudisa, J. H. Dholakiya and R. V. Babu, "Saliency Unified: A Deep Architecture for simultaneous Eye Fixation Prediction and Salient Object Segmentation," 2016 IEEE Conference on Computer Vision and Pattern Recognition (CVPR), Las Vegas, NV, USA, 2016, pp. 5781-5790, (Year: 2016).*
Hou et al ("Deeply Supervised Salient Object Detection with Short Connections", pp. 3203-3212, XP055689827, DOI: 10.1109CVPR. 2017.563, published Apr. 9, 2017. Retrieved from the Internet on Aug. 24, 2021 (Year: 2017).*
S. 8. S. Kruthiventi, V. Gudisa, J. H. Dholakiya and R. V. Babu, "Saliency Unified: A Deep Architecture for simultaneous Eye Fixation Prediction and Salient Object Segmentation," 2016 IEEE Conference on Computer Vision and Pattern Recognition (CVPR), Las Vegas, NV, USA, 2016, pp. 5781-5790, (Year: 2016).*
Li, Guanbin, et al. "Instance-Level Salient Object Segmentation." ArXiv:1704.03604 [Cs], Apr. 2017. arXiv.org, http://arxiv.org/abs/1704.03604. (Year: 2017).*
Machine Translation and Abstract of Chinese Publication No. CN101329767, Dec. 24, 2008, 22 pages.
Machine Translation and Abstract of Chinese Publication No. CN101520894, Sep. 2, 2009, 14 pages.
Machine Translation and Abstract of Chinese Publication No. CN101526955, Sep. 9, 2009, 10 pages.
Machine Translation and Abstract of Chinese Publication No. CN101650824, Feb. 17, 2010, 10 pages.
Machine Translation and Abstract of Chinese Publication No. CN102184557, Sep. 12, 2012, 11 pages.
Machine Translation and Abstract of Chinese Publication No. CN104463865, Mar. 25, 2015, 8 pages.
Machine Translation and Abstract of Chinese Publication No. CN104537393, Apr. 22, 2015, 13 pages.
Machine Translation and Abstract of Chinese Publication No. CN104680508, Jun. 3, 2015, 31 pages.
Machine Translation and Abstract of Chinese Publication No. CN104794504, Jul. 22, 2015, 15 pages.
Machine Translation and Abstract of Chinese Publication No. CN105787482, Jul. 20, 2016, 6 pages.
Machine Translation and Abstract of Chinese Publication No. CN106127725, Nov. 16, 2016, 20 pages.
Machine Translation and Abstract of Chinese Publication No. CN106157319, Nov. 23, 2016, 13 pages.
Martin, D., et al,. "A database of human segmented natural images and its application to evaluating segmentation algorithms and measuring ecological statistics," In ICCV, vol. 2, 2001, pp. 416-423.
Itti, L., et al., "A Model of Saliency-Based Visual Attention for Rapid Scene Analysis," IEEE Transactions on Pattern Analysis and Machine Intelligence, vol. 20, No. 11, Nov. 1998, pp. 1254-1259.
Goferman, S., et al. "Context-Aware Saliency Detection," IEEE Transactions on Pattern Analysis and Machine Intelligence, vol. 34, No. 10, Oct. 2012, pp. 1915-1926.
Li, X., et al,. "Contextual hypergraph modeling for salient object detection," In ICCV, 2013, pp. 3328-3335.
Ma, Y., et al. "Contrast-based Image Attention Analysis by Using Fuzzy Growing," MM'03, Nov. 2-8, 2003, pp. 374-381.
Li, G., "Deep contrast learning for salient object detection," In CVPR, 2016, pp. 478-487.
Lee, G., et al. "Deep Saliency with Encoded Low level Distance Map and High Level Features," arXiv:1604.05495v1 [cs.CV], Apr. 19, 2016, pp. 1-9.
Movahedi, V., et al., "Design and perceptual validation of performance measures for salient object segmentation," In IEEE CVPRW, IEEE, 2010, pp. 49-56.
Li, X., et al., "DeepSaliency: Multi-task deep neural network model for salient object detection," IEEE Transactions on Image Processing, vol. 25, No. 8, Aug. 2016, pp. 3919-3930.
Liu, N., et al., "DHSNet: Deep hierarchical saliency network for salient object detection," In CVPR, 2016, pp. 678-686.
Cheng, M., et al., "Efficient salient region detection with soft image abstraction," In ICCV, 2013, pp. 1529-1536.
Achanta, R., et al. "Frequency-tuned Salient Region Detection," IEEE, 2009, pp. 1597-1604.
Long, J., et al. "Fully Convolutional Networks for Semantic Segmentation," IEEE, 2015, pp. 3431-3440.
Yan, Q., et al,. "Hierarchical saliency detection," In CVPR, 2013, pp. 1155-1162.
Xie, S., et al., "Holistically-Nested Edge Detection," arXiv:1504. 06375v2 [cs.CV], Oct. 4, 2015, pp. 1-10.
Liu, T., et al. "Learning to Detect A Salient Object," IEEE, 2007, 8 pages.
Liu, T., et al,. "Learning to detect a salient object," IEEE Transactions on Pattern Analysis and Machine Intelligence, vol. 33, No. 2, Feb. 2011, pp. 353-367.
Zhao, R., et al. "Saliency Detection by Multi-Context Deep Learning," IEEE, 2015, pp. 1265-1274.
Li, X., et al,. "Saliency detection via dense and sparse reconstruction," In ICCV, 2013, pp. 2976-2983.
Wang, L et al,. "Saliency detection with recurrent fully convolutional networks," In ECCV, 2016, pp. 825-841.
Jiang, H., et al,. "Salient object detection: A discriminative regional feature integration approach," In CVPR, 2013, pp. 2083-2090.
Li, Y., et al,. "The secrets of salient object segmentation," In CVPR, 2014, pp. 280-287.
Zhai, Y., et al. "Visual Attention Detection in Video Sequences Using Spatiotemporal Cues," ACM MM'06, Oct. 23-27, 2006, pp. 815-824.

(56) References Cited

OTHER PUBLICATIONS

Li, G., et al., "Visual saliency based on multiscale deep features," In CVPR, 2015, pp. 5455-5463.
Foreign Communication From A Counterpart Application, PCT Application No. PCT/CN2018/092514, English Translation of International Search Report and Written Opinion dated Sep. 26, 2018, 6 pages.
Xie, S, et al., "Holistically-Nested Edge Detection," XP055555388, Dec. 1, 2015, pp. 1395-1403.
Hou, Q., et al., "Deeply Supervised Salient Object Detection with Short Connections," XP055689827, retrieved from the internet:https://arxiv.org/pdf/1611.04849v2.pdf, Apr. 9, 2017, 10 pages.
Borji, A., et al., "Salient Object Detection: A Benchmark," IEEE Transactions on Image Processing, XP055690550, Retrieved from the internet:https://arxiv.org/pdf/1501.02741v1.pdf, Jan. 5, 2015, 15 pages.
Sun, N., "Analysis for method of image saliency detection," Modern Electronics Technique, Issue 22, Nov. 15, 2014, 5 pages.
Gu, J., et al., "Incremental Convolution Neural Network and Its Application in Face Detection," Journal of System Simulation, vol. 21 No. 8, Apr. 30, 2009, 24 pages (with translation of related pages and abstract).
Liu, S., et al, "Interest Region Detection Based on Visual Saliency and Feature Integration," Geography and Geo-Information Science, Issue 05, Sep. 30, 2014, 6 pages.

\* cited by examiner

METHOD AND APPARATUS FOR DETECTING SALIENT OBJECT IN IMAGE

CROSS-REFERENCE TO RELATED APPLICATIONS

This application is a continuation of International Patent Application No. PCT/CN2018/092514 filed on Jun. 22, 2018, which claims priority to Chinese Patent Application No. 201710488970.4 filed on Jun. 23, 2017. The disclosures of the aforementioned applications are hereby incorporated by reference in their entireties.

TECHNICAL FIELD

This application relates to the field of computer image processing, and in particular, to a method and an apparatus for detecting a salient object in an image.

BACKGROUND

Salient object detection is a process of detecting an object region that can attract visual attention of human eyes most from an image. In an existing method for detecting a salient object in an image, based on an existing convolutional neural network architecture, the convolutional neural network architecture is finely adjusted, to detect the salient object in the image. As shown in FIG. 1, one side output layer is connected to each convolutional layer in a convolutional neural network architecture, and one fusion layer is connected to all side output layers. When an image is processed, feature maps with different resolutions are respectively output after the to-be-processed image is processed at convolutional layers. Then, side output feature maps are obtained after simple sampling processing is separately performed on the feature maps with different resolutions at the side output layers. Finally, the side output feature maps obtained at different layers are fused at the fusion layer to obtain a saliency detection result of the to-be-processed image, thereby detecting a salient object in the image. However, because saliency detection images of the side output feature maps at the different side output layers differ greatly (a feature map at a shallow layer is too messy, and a feature map extracted at a deep layer lacks regularity), the side output feature maps at the different layers are simply and directly fused at the fusion layer. In this case, the finally obtained saliency detection result of the to-be-processed image is not ideal.

SUMMARY

This application provides a method and an apparatus for detecting a salient object in an image to improve an effect of detecting the salient object in the image.

According to a first aspect, a method for detecting a salient object in an image is provided. The method includes separately performing convolution processing corresponding to at least two convolutional layers on a to-be-processed image to obtain at least two first feature maps of the to-be-processed image, where resolutions of the at least two first feature maps are lower than a resolution of the to-be-processed image, and resolutions of any two of the at least two first feature maps are different, processing the at least two first feature maps to obtain at least two second feature maps of the to-be-processed image, and splicing the at least two second feature maps to obtain a saliency map of the to-be-processed image. At least one of the at least two second feature maps is obtained by performing superposition processing on a plurality of the at least two first feature maps, resolutions of any two of the at least two second feature maps are different, and a resolution of the at least one second feature map is higher than or equal to a maximum resolution in the plurality of first feature maps that are used to obtain the at least one second feature map.

In this application, the at least two first feature maps of the to-be-processed image are processed to obtain at least two second feature maps whose resolutions are higher than or equal to those of the at least two first feature maps, and resolutions of any two of the at least two second feature maps are different. The at least two feature maps with different resolutions are spliced, thereby obtaining a saliency map with a better effect.

For example, when superposition processing is performed on at least two first feature maps, a most salient region of a first feature map with a higher resolution may be located based on a first feature map with a lower resolution. In addition, sparsity and irregularity of the first feature map with the lower resolution may also be improved based on the first feature map with the higher resolution. In this way, a second feature map finally obtained by performing superposition processing on the at least two first feature maps in the superposition set can better display a salient region in an image. Then, after at least two second feature maps are spliced, a saliency map with a better effect can be obtained.

It should be understood that, a size of a convolution kernel of convolution processing used when convolution processing corresponding to at least two convolutional layers is separately performed on the to-be-processed image may be 1. In addition, a function of performing convolution processing corresponding to the at least two convolutional layers may be extracting a feature map required for saliency segmentation from the to-be-processed image.

With reference to the first aspect, in some implementations of the first aspect, performing superposition processing on a plurality of the at least two first feature maps includes upsampling a first feature map, in the plurality of first feature maps, whose resolution is lower than the resolution of the at least one second feature map to be obtained to obtain a third feature map corresponding to the first feature map, where a resolution of the third feature map is equal to the resolution of the at least one second feature map to be obtained, and performing superposition processing on the third feature map obtained by upsampling and a first feature map, in the plurality of first feature maps, on which upsampling is not performed, to obtain the at least one second feature map. It should be understood that resolutions of some first feature maps may be lower than resolutions of some second feature maps. In this case, some first feature maps with lower resolutions are upsampled such that resolutions of all first feature maps can be the same, and an effect of superposition processing can be ensured.

In specific implementation, a first feature map on which upsampling is not performed in the plurality of first feature maps may not exist. For example, all of the plurality of feature maps may be upsampled, and superposition processing is performed on a third feature map obtained by upsampling, thereby obtaining the at least one feature map.

With reference to the first aspect, in some implementations of the first aspect, the performing superposition processing on the third feature map obtained by upsampling and a first feature map, in the plurality of first feature maps, on which upsampling is not performed to obtain the at least one second feature map includes performing, based on a weight corresponding to each third feature map or each first feature map, superposition processing on the third feature map obtained by upsampling and the first feature map, in the plurality of first feature maps, on which upsampling is not performed to obtain the at least one second feature map.

With reference to the first aspect, in some implementations of the first aspect, the weight is obtained by training based on a difference between a saliency map of a training image and a reference saliency map corresponding to the training image.

With reference to the first aspect, in some implementations of the first aspect, splicing the at least two second feature maps of the to-be-processed image to obtain a saliency map of the to-be-processed image includes splicing the at least two second feature maps based on a weight corresponding to each of the at least two second feature maps to obtain the saliency map of the to-be-processed image.

A weight corresponding to each of the at least two second feature maps may be multiplied by a pixel value of each second feature map, results of multiplying the weight by the pixel value are summed up, a pixel value result obtained by summing up is used as a pixel value of a saliency map of the to-be-processed image to obtain the saliency map of the to-be-processed image.

With reference to the first aspect, in some implementations of the first aspect, the weight of each of the at least two second feature maps is determined based on a difference between a saliency map of a training image and a reference saliency map corresponding to the training image.

With reference to the first aspect, in some implementations of the first aspect, performing superposition processing on the third feature map obtained by upsampling and a first feature map, in the plurality of first feature maps, on which upsampling is not performed to obtain the at least one second feature map includes performing superposition, convolution, and pooling processing on the third feature map obtained by upsampling and the first feature map, in the plurality of first feature maps, on which upsampling is not performed, to obtain the at least one second feature map.

With reference to the first aspect, in some implementations of the first aspect, splicing the at least two second feature maps to obtain a saliency map of the to-be-processed image includes performing convolution processing on the at least two second feature maps, to obtain features of the at least two second feature maps, and splicing the features of the at least two second feature maps to obtain the saliency map of the to-be-processed image.

It should be understood that a size of a convolution kernel used when convolution processing is performed on the at least two second feature maps may be 1. Features of the second feature maps can be further extracted through the convolution processing. In this way, local features in a processed image can be more distinguishable from each other, thereby achieving a better saliency detection effect.

Before maps are spliced, convolution processing is first performed on the maps. A map feature can be further extracted, and an extracted feature map is used as a basis of subsequent splicing, thereby reducing complexity of the subsequent splicing. A feature with a relatively low value can be excluded through feature extraction such that an effect of the finally obtained saliency map is improved.

With reference to the first aspect, in some implementations of the first aspect, the method further includes performing guided filtering on the saliency map of the to-be-processed image based on the to-be-processed image to obtain a segmented image of the to-be-processed image.

An image segmentation edge in the saliency map of the to-be-processed image can be further optimized through guided filtering, thereby obtaining a segmented image with a better effect.

With reference to the first aspect, in some implementations of the first aspect, the saliency map is a first saliency map, a resolution of the first saliency map is lower than the resolution of the to-be-processed image, and performing guided filtering on the saliency map of the to-be-processed image based on the to-be-processed image to obtain a segmented image of the to-be-processed image includes upsampling the first saliency map to obtain a second saliency map whose resolution is the same as the resolution of the to-be-processed image, and performing guided filtering on the second saliency map based on the to-be-processed image to obtain the segmented image of the to-be-processed image.

According to a second aspect, a method for detecting a salient object in an image is provided. The method includes separately performing convolution processing corresponding to at least two convolutional layers on a to-be-processed image to obtain at least two first feature maps of the to-be-processed image, where resolutions of the at least two first feature maps are lower than a resolution of the to-be-processed image, and resolutions of any two of the at least two first feature maps are different, performing superposition processing on at least two first feature maps included in a superposition set in at least two sets to obtain at least two second feature maps of the to-be-processed image, where the at least two sets are respectively corresponding to different resolutions, the at least two sets are in a one-to-one correspondence with the at least two second feature maps, and a resolution of a first feature map included in the superposition set is lower than or equal to a resolution of a second feature map corresponding to the superposition set, and splicing the at least two second feature maps to obtain a saliency map of the to-be-processed image.

After the at least two first feature maps are obtained through the convolution processing, different from that in the other approaches in which a final saliency map is obtained by directly performing superposition processing on the at least two first feature maps, in this application, the at least two sets are first determined based on the resolutions, the feature maps included in the superposition set in the at least two sets are superposed, and then the second feature maps obtained in the sets are spliced to obtain the saliency map of the to-be-processed image. In addition, in processes of superposing and splicing, features of the feature maps with different resolutions are fully considered, thereby obtaining a saliency map with a better effect.

For example, when superposition processing is performed on at least two first feature maps included in a specific superposition set, a most salient region of a first feature map with a higher resolution may be located based on a first feature map with a lower resolution in the superposition set. In addition, sparsity and irregularity of the first feature map with the lower resolution may also be improved based on the first feature map with the higher resolution. In this way, a second feature map finally obtained by performing superposition processing on the at least two first feature maps in the superposition set can better display a salient region in an image. Then, after at least two second feature maps obtained after performing superposition processing on the at least two sets are spliced, a saliency map with a better effect can be obtained.

It should be understood that the superposition set may be a set in the at least two sets that includes at least two first feature maps. In addition, the at least two sets may include another set in addition to the superposition set. For example, the at least two sets may also include a set including only one first feature map. When a specific set includes only one first feature map, the first feature map included in the set is not superposed, but the first feature map may be directly determined as a second feature map corresponding to the set.

It should be further understood that a resolution corresponding to each of the at least two sets may be a resolution of a second feature map obtained after superposition processing is performed on first feature maps in the set.

In addition, a size of a convolution kernel of convolution processing used when convolution processing corresponding to at least two convolutional layers is separately performed on the to-be-processed image may be 1. In addition, a function of performing convolution processing corresponding to the at least two convolutional layers may be extracting a feature map required for saliency segmentation from the to-be-processed image. Then, the extracted feature map is further processed, to obtain a saliency map of the to-be-processed image.

With reference to the second aspect, in some implementations of the second aspect, the separately performing superposition processing on at least two first feature maps included in a superposition set in at least two sets includes upsampling a first feature map, in the superposition set, whose resolution is lower than the resolution of the second feature map corresponding to the superposition set, to obtain at least two third feature maps whose resolutions are the same as the resolution of the second feature map corresponding to the superposition set, where the at least two third feature maps are in a one-to-one correspondence with the at least two first feature maps, and superposing the at least two third feature maps to obtain the second feature map corresponding to the superposition set.

It should be understood that resolutions of some first feature maps in the superposition set may be lower than the resolution of the second feature map corresponding to the superposition set. In this case, some first feature maps with lower resolutions are upsampled such that resolutions of all first feature maps in the superposition set can be the same, and an effect of superposition processing can be ensured.

With reference to the second aspect, in some implementations of the second aspect, the superposing the at least two third feature maps to obtain the second feature map corresponding to the superposition set includes superposing the at least two third feature maps based on a weight corresponding to each of the at least two third feature maps, to obtain the second feature map.

A weight corresponding to each of the at least two third feature maps may be multiplied by a pixel value of each third feature map, results obtained by multiplying are summed up, and a result obtained by summing up is used as a pixel value of a second feature map to obtain the second feature map.

With reference to the second aspect, in some implementations of the second aspect, the weight of each of at least one third feature map is obtained by training based on a difference between a saliency map of a training image and a reference saliency map corresponding to the training image.

A procedure of obtaining the saliency map of the training image may be consistent with the procedure of obtaining the saliency map of the to-be-processed image. Therefore, before the to-be-processed image is processed, the saliency map of the training image may be first obtained according to the procedure of the method in the second aspect, and then the weight of each of the at least one third feature map is trained based on the difference between the saliency map of the training image and the reference saliency map corresponding to the training image to obtain the weight of each third feature map.

With reference to the second aspect, in some implementations of the second aspect, splicing the at least two second feature maps of the to-be-processed image to obtain a saliency map of the to-be-processed image includes splicing the at least two second feature maps based on a weight corresponding to each of the at least two second feature maps to obtain the saliency map of the to-be-processed image.

A weight corresponding to each of the at least two second feature maps may be multiplied by a pixel value of each second feature map, results of multiplying the weight by the pixel value are summed up, a pixel value result obtained by summing up is used as a pixel value of a saliency map of the to-be-processed image to obtain the saliency map of the to-be-processed image.

With reference to the second aspect, in some implementations of the second aspect, the weight of each of the at least two second feature maps is determined based on a difference between a saliency map of a training image and a reference saliency map corresponding to the training image.

A procedure of obtaining the saliency map of the training image may be consistent with the procedure of obtaining the saliency map of the to-be-processed image. Therefore, before the to-be-processed image is processed, the saliency map of the training image may be first obtained according to the procedure of the method in the second aspect, and then the weight of each of the at least two second feature maps is trained based on the difference between the saliency map of the training image and the reference saliency map corresponding to the training image to obtain the weight of each second feature map.

With reference to the second aspect, in some implementations of the second aspect, performing superposition processing on at least two first feature maps included in a superposition set in at least two sets to obtain at least two second feature maps of the to-be-processed image includes performing superposition processing on the at least two first feature maps included in the superposition set in the at least two sets, performing convolution processing on at least two feature maps obtained after the superposition processing to obtain at least two feature maps on which convolution processing is performed, where the convolution processing is used to extract features of the at least two feature maps obtained after the superposition processing, and performing pooling processing on the at least two feature maps obtained through the convolution processing to obtain the at least two second feature maps.

A size of a convolution kernel used when convolution processing is performed on the at least two feature maps obtained after the superposition processing may be 1. The at least two feature maps obtained after the superposition processing can be collected in an integrated manner through the convolution processing to highlight high-value features of the feature maps.

Convolution processing and pooling processing are performed on the at least two feature maps obtained after the superposition. A map feature obtained after the superposition can be further extracted, and an extracted feature is used as the second feature map, thereby reducing a calculation amount of subsequent processing. In addition, a feature with a relatively low value can be excluded through feature extraction such that an effect of the finally obtained saliency map is improved.

With reference to the second aspect, in some implementations of the second aspect, splicing the at least two second feature maps to obtain a saliency map of the to-be-processed image includes performing convolution processing on the at least two second feature maps, to obtain features of the at least two second feature maps, and splicing the features of the at least two second feature maps to obtain the saliency map of the to-be-processed image.

It should be understood that a size of a convolution kernel used when convolution processing is performed on the at least two second feature maps may be 1. Features of the second feature maps can be further extracted through the convolution processing. In this way, local features in a processed image can be more distinguishable from each other, thereby achieving a better saliency detection effect.

Before maps are spliced, convolution processing is first performed on the maps. A map feature can be further extracted, and an extracted feature map is used as a basis of subsequent splicing, thereby reducing complexity of the subsequent splicing. A feature with a relatively low value can be excluded through feature extraction such that an effect of the finally obtained saliency map is improved.

With reference to the second aspect, in some implementations of the second aspect, the method further includes performing guided filtering on the saliency map of the to-be-processed image based on the to-be-processed image to obtain a segmented image of the to-be-processed image.

An image segmentation edge in the saliency map of the to-be-processed image can be further optimized through guided filtering, thereby obtaining a segmented image with a better effect.

With reference to the second aspect, in some implementations of the second aspect, the saliency map is a first saliency map, a resolution of the first saliency map is lower than the resolution of the to-be-processed image, and performing guided filtering on the saliency map of the to-be-processed image based on the to-be-processed image to obtain a segmented image of the to-be-processed image includes upsampling the first saliency map to obtain a second saliency map whose resolution is the same as the resolution of the to-be-processed image, and performing guided filtering on the second saliency map based on the to-be-processed image to obtain the segmented image of the to-be-processed image.

According to a third aspect, an apparatus for detecting a salient object in an image is provided. The apparatus includes modules configured to perform the method in the first aspect or various implementations of the first aspect.

According to a fourth aspect, an apparatus for detecting a salient object in an image is provided. The apparatus includes a storage medium and a central processing unit, the storage medium stores a computer executable program, and the central processing unit is connected to the storage medium, and executes the computer executable program to implement the method in the first aspect or various implementations of the first aspect.

According to a fifth aspect, a computer readable medium is provided. The computer readable medium stores program code to be executed by a device, and the program code includes an instruction used to perform the method in the first aspect or the various implementations of the first aspect.

DESCRIPTION OF EMBODIMENTS

The following describes the technical solutions in this application with reference to the accompanying drawings.

Figure 1:
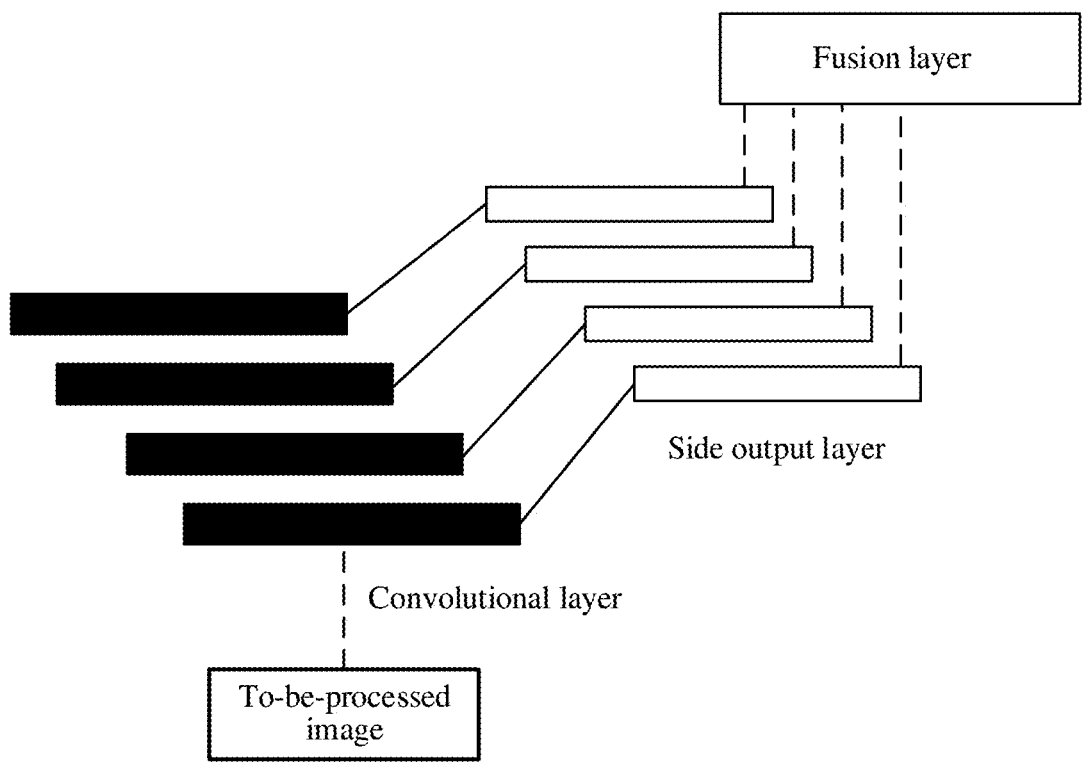
FIG. 1 is a schematic diagram of a network architecture of an existing method for detecting a salient object in an image.
Figure 2:
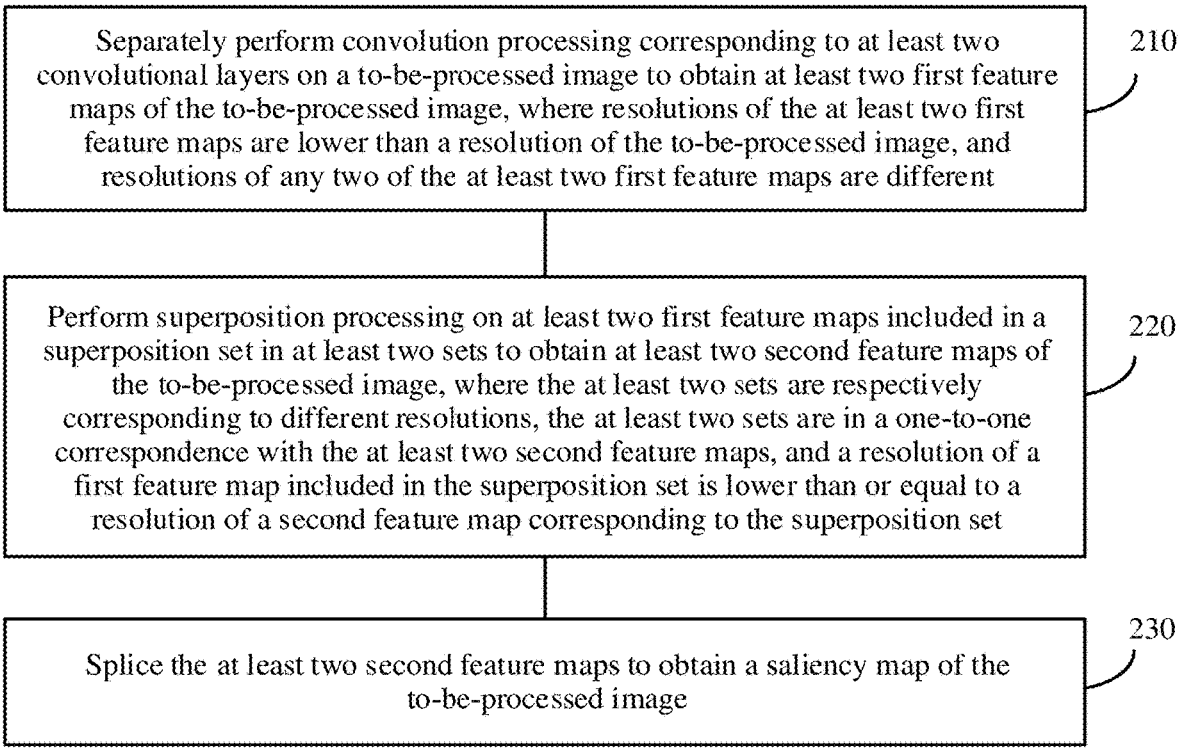
FIG. 2 is a schematic flowchart of a method for detecting a salient object in an image according to an embodiment of this application.

FIG. 2 is a schematic flowchart of a method for detecting a salient object in an image according to an embodiment of this application. The method in FIG. 2 may be performed in a network architecture of a convolutional neural network. The method in FIG. 2 includes the following steps.

Step 210. Separately perform convolution processing corresponding to at least two convolutional layers on a to-be-processed image to obtain at least two first feature maps of the to-be-processed image, where resolutions of the at least two first feature maps are lower than a resolution of the to-be-processed image, and resolutions of any two of the at least two first feature maps are different.

A size of a convolution kernel used when convolution processing is performed on the to-be-processed image may be 1. In addition, a function of performing convolution processing may be extracting a feature map required for saliency segmentation from the to-be-processed image. Then, the extracted feature map is further processed to obtain a saliency map of the to-be-processed image.

The to-be-processed image may be an original image that needs to be processed, or may be an image obtained after downsampling processing is performed on the original image. The original image is first downsampled before the saliency map of the image is obtained, thereby reducing a resolution of the image, and decreasing complexity of subsequent image processing.

The resolution of the first feature map may be lower than the resolution of the to-be-processed image. For example, if the to-be-processed image is an image whose resolution is 256×256, the resolution of the first feature map may be 128×128, 64×64, 32×32, 16×16, 8×8, or the like.

In addition, when convolution processing is performed on the to-be-processed image, convolution processing may be separately performed on the to-be-processed image at different convolutional layers to obtain first feature maps with different resolutions. For example, the to-be-processed image is an image whose resolution is 256×256, and after convolution processing is performed on the to-be-processed image at four convolutional layers, four first feature maps whose resolutions are respectively 64×64, 32×32, 16×16, and 8×8 are obtained.

Step 220. Perform superposition processing on at least two first feature maps included in a superposition set in at least two sets to obtain at least two second feature maps of the to-be-processed image, where the at least two sets are respectively corresponding to different resolutions, the at least two sets are in a one-to-one correspondence with the at least two second feature maps, and a resolution of a first feature map included in the superposition set is lower than or equal to a resolution of a second feature map corresponding to the superposition set.

It should be understood that the superposition set in step 220 may be a set in the at least two sets that includes at least two first feature maps. In addition, the at least two sets may include another set in addition to the superposition set. For example, the at least two sets may also include a set including only one first feature map. When a specific set includes only one first feature map, the first feature map included in the set is not superposed, but the first feature map may be directly determined as a second feature map corresponding to the set. In addition, it should be further understood that a resolution corresponding to each of the at least two sets may be a resolution of a second feature map obtained after superposition processing is performed on first feature maps in the set.

For example, when superposition processing is performed on at least two first feature maps included in a specific superposition set, a most salient region of a first feature map with a higher resolution may be located based on a first feature map with a lower resolution in the superposition set. In addition, sparsity and irregularity of the first feature map with the lower resolution may also be improved based on the first feature map with the higher resolution. In this way, a second feature map finally obtained by performing superposition processing on the at least two first feature maps in the superposition set can better display a salient region in an image. Then, after at least two second feature maps obtained after performing superposition processing on the at least two sets are spliced, a saliency map with a better effect can be obtained.

The following describes obtaining of the at least two second feature maps in the at least two sets with reference to a specific case. For example, four first feature maps are obtained after convolution processing is performed on the to-be-processed image, and the four first feature maps are respectively A, B, C, and D. Resolutions of A, B, C, and D are respectively 64×64, 32×32, 16×16, and 8×8. Resolutions corresponding to a set 1 to a set 4 are respectively 64×64, 32×32, 16×16, and 8×8. In this case, the set 1 includes A, B, C, and D, the set 2 includes B, C, and D, the set 3 includes C and D, and the set 4 includes only D. The set 1 to the set 3 each include at least two first feature maps. Therefore, the set 1 to the set 3 may be referred to as superposition sets. Because the set 4 includes only one first feature map, the set 4 is not a superposition set. For the set 1, a second feature map corresponding to the set 1 may be obtained by superposing A, B, C, and D. For the set 2, a second feature map corresponding to the set 2 may be obtained by superposing B, C, and D. For the set 3, a second feature map corresponding to the set 2 may be obtained by superposing C and D. For the set 4, because only D is included, D may be directly determined as a second feature map corresponding to the set 4.

Optionally, separately performing superposition processing on at least two first feature maps included in a superposition set in at least two sets in step 220 includes upsampling a first feature map, in the superposition set, whose resolution is lower than the resolution of the second feature map corresponding to the superposition set to obtain at least two third feature maps whose resolutions are the same as the resolution of the second feature map corresponding to the superposition set, where the at least two third feature maps are in a one-to-one correspondence with the at least two first feature maps, and superposing the at least two third feature maps to obtain the second feature map corresponding to the superposition set.

It should be understood that resolutions of some first feature maps in the superposition set may be lower than the resolution of the second feature map corresponding to the superposition set. In this case, some first feature maps with lower resolutions are upsampled such that resolutions of all first feature maps in the superposition set can be the same, and an effect of superposition processing can be ensured.

Optionally, the superposing the at least two third feature maps to obtain the second feature map corresponding to the superposition set includes superposing the at least two third feature maps based on a weight corresponding to each of the at least two third feature maps to obtain the second feature map.

It should be understood that the superposing the at least two third feature maps based on a weight corresponding to each of the at least two third feature maps may be multiplying the weight corresponding to each of the at least two third feature maps by a pixel value of each third feature map, summing up results obtained after multiplying, and using a result obtained by summing up as a pixel value of the second feature map to obtain the second feature map.

For example, after three first feature maps included in a specific superposition set are processed, three third feature maps are obtained. It is assumed that the three feature maps are respectively X, Y, and Z, and weights of X, Y, and Z are respectively 30%, 30%, and 40%. When X, Y, and Z are superposed, 30% of a pixel value of X, 30% of a pixel value of Y, and 40% of a pixel value of Z are summed up, and a result obtained by summing up is used as a pixel value of a second feature map W obtained after the superposition.

In addition, the weight of each of at least one third feature map may be obtained by training based on a difference between a saliency map of a training image and a reference saliency map corresponding to the training image.

A procedure of obtaining the saliency map of the training image may be consistent with the procedure of obtaining the saliency map of the to-be-processed image. Therefore, before the to-be-processed image is processed, the saliency map of the training image may be first obtained according to the procedure of the method in the first aspect, and then the weight of each of the at least one third feature map is trained based on the difference between the saliency map of the training image and the reference saliency map corresponding to the training image to obtain the weight of each third feature map.

Step 230. Splice the at least two second feature maps to obtain the saliency map of the to-be-processed image.

In this application, after the at least two first feature maps are obtained through the convolution processing, different from that in the other approaches in which a final saliency map is obtained by directly performing superposition processing on the at least two first feature maps, the at least two sets are first determined based on the resolutions, the feature maps included in the superposition set in the at least two sets are superposed, and then the second feature maps obtained in the sets are spliced to obtain the saliency map of the to-be-processed image. In addition, in processes of superposing and splicing, features of the feature maps with different resolutions are fully considered, thereby obtaining a saliency map with a better effect.

For example, when superposition processing is performed on at least two first feature maps included in a specific superposition set, a most salient region of a first feature map with a higher resolution may be located based on a first feature map with a lower resolution in the superposition set. In addition, sparsity and irregularity of the first feature map with the lower resolution may also be improved based on the first feature map with the higher resolution. In this way, a second feature map finally obtained by performing superposition processing on the at least two first feature maps in the superposition set can better display a salient region in an image. Then, after at least two second feature maps obtained after performing superposition processing on the at least two sets are spliced, a saliency map with a better effect can be obtained.

Optionally, in an embodiment, splicing the at least two second feature maps to obtain the saliency map of the to-be-processed image in step 230 includes splicing the at least two second feature maps based on a weight corresponding to each of the at least two second feature maps to obtain the saliency map of the to-be-processed image.

It should be understood that the splicing the at least two second feature maps based on a weight corresponding to each of the at least two second feature maps may be multiplying the weight corresponding to each of the at least two second feature maps by a pixel value of each second feature map, summing up results of multiplying the weight by the pixel value, and using a pixel value result obtained by summing up as a pixel value of the saliency map of the to-be-processed image to obtain the saliency map of the to-be-processed image.

It should be understood that the weight of each of the at least two second feature maps may be determined based on a difference between a saliency map of a training image and a reference saliency map corresponding to the training image.

In addition, a procedure of obtaining the saliency map of the training image may be consistent with the procedure of obtaining the saliency map of the to-be-processed image. Therefore, before the to-be-processed image is processed, the saliency map of the training image may be first obtained according to the procedure of the method in the first aspect, and then the weight of each of the at least two second feature maps is trained based on the difference between the saliency map of the training image and the reference saliency map corresponding to the training image to obtain the weight of each second feature map.

It should be understood that, the reference saliency map corresponding to the training image may be a human-annotated saliency map, or a saliency map with a better effect that is recognized by a machine. The difference between the saliency map of the training image and the reference saliency map corresponding to the training image may be represented using a function value of a loss function. In a weight training process, the function value of the loss function may be reversely propagated in a convolutional neural network, and all weights are adjusted. The weights may be adjusted along a direction in which function values of the loss function are in descending order, until a global optimal solution is achieved (a final adjustment result may be that the function value of the loss function is minimum or the function value of the loss function is less than a specific threshold).

Figure 3:
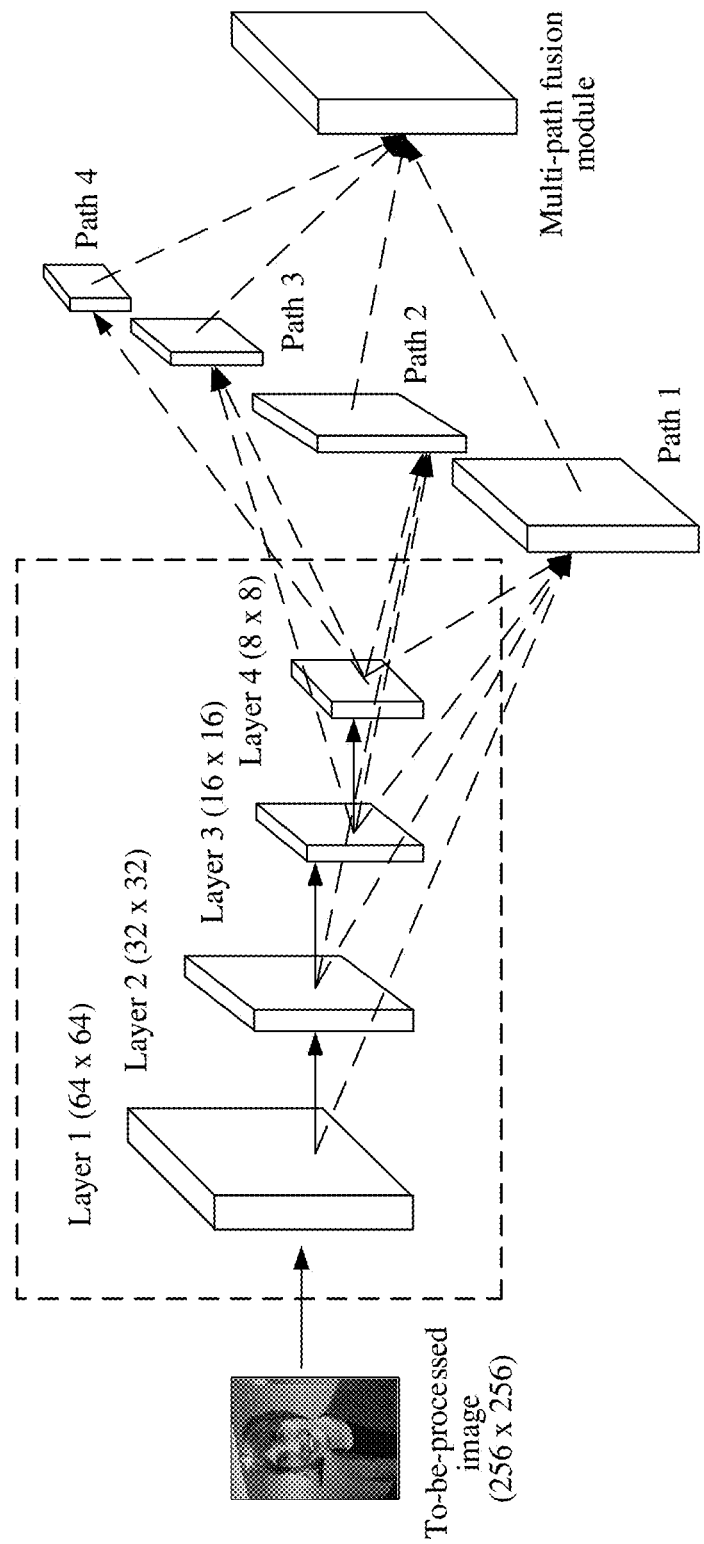
FIG. 3 is a schematic diagram of a convolutional neural network architecture according to an embodiment of this application.

In the foregoing method in FIG. 2, there are four sets in total, and the four sets may correspond to a path 1 to a path 4 shown in FIG. 3. An output loss function used when a first feature map corresponding to each path is processed on the path is $l_{side}^{m}$, m=1, . . . , 4. In this case, an output loss function of all paths is $L_{side}=\Sigma_{m=1}^{4}\alpha_{m}l_{side}^{(m)}$, where $\alpha_m$ is an output loss weight on an $m^{th}$ path, and a loss function used when a path fusion module processes four second feature maps output on the four paths is $L_{fuse}$. In this case, a final loss function for processing the to-be-processed image is $L_{final}=L_{fuse}+L_{side}$. The final loss function herein may indicate the difference between the saliency map of the training image and the reference saliency map corresponding to the training image.

Optionally, in an embodiment, performing superposition processing on at least two first feature maps included in a superposition set in at least two sets in step 220 includes performing superposition processing on the at least two first feature maps included in the superposition set in the at least two sets, performing convolution processing on at least two feature maps obtained after the superposition processing, to obtain at least two feature maps on which convolution processing is performed, where the convolution processing is used to extract features of the at least two feature maps obtained after the superposition processing, and performing pooling processing on the at least two feature maps obtained through the convolution processing to obtain the at least two second feature maps in step 220.

It should be understood that a size of a convolution kernel used when convolution processing is performed on the at least two feature maps obtained after the superposition processing may be 1. The at least two feature maps obtained after the superposition processing can be collected in an integrated manner by performing convolution processing on the at least two feature maps, to highlight high-value features of the feature maps.

A feature of an image obtained after the superposition can be further extracted by performing convolution processing and pooling processing on the at least two feature maps obtained after the superposition, and the extracted feature is used as the second feature map such that a calculation amount of subsequent processing can be reduced. In addition, a feature with a relatively low value can be excluded through feature extraction such that an effect of the finally obtained saliency map is improved.

Optionally, in an embodiment, splicing the at least two second feature maps of the to-be-processed image in step 230 includes performing convolution processing on the at least two second feature maps to obtain features of the at least two second feature maps, and splicing the features of the at least two second feature maps to obtain the saliency map of the to-be-processed image.

A size of a convolution kernel used when convolution processing is performed on the at least two second feature maps may be 1. The features of the second feature maps can be further extracted through the convolution processing. In this way, local features in a processed image can be more distinguishable from each other, thereby achieving a better saliency detection effect.

Before maps are spliced, convolution processing is first performed on the maps. A map feature can be further extracted, and an extracted feature map is used as a basis of subsequent splicing, thereby reducing complexity of the subsequent splicing. In addition, a feature with a relatively low value can be excluded through feature extraction such that an effect of the finally obtained saliency map is improved.

It should be understood that, in step 220 and step 230, superposition processing performed on the at least two first feature maps included in the superposition set in the at least two sets is equivalent to superposition processing separately performed on at least two first feature maps along different paths, and splicing the at least two second feature maps is equivalent to splicing second feature maps obtained from at least two different paths. For example, as shown in FIG. 3, a convolutional neural network architecture includes four layers (each layer is equivalent to a convolutional layer), four paths, and a path fusion module. Convolution processing is separately performed on a to-be-processed image (a resolution of the to-be-processed image shown in FIG. 3 is 256×256) at a layer 1 to a layer 4, and four first feature maps whose resolutions are respectively 64×64, 32×32, 16×16, and 8×8 are obtained. Then, a first feature map on each path is processed from the path 1 to the path 4, and a specific process includes performing, along the path 1, superposition processing on the four first feature maps whose resolutions are respectively 64×64, 32×32, 16×16, and 8×8 to obtain a second feature map, performing, along the path 2, superposition processing on three first feature maps whose resolutions are respectively 32×32, 16×16, and 8×8 to obtain a second feature map, performing, along the path 3, superposition processing on two first feature maps whose resolutions are respectively 16×16 and 8×8 to obtain a second feature map, and processing, along the path 4, a first feature map whose resolution is 8×8 to obtain a second feature map (on the path 4, the first feature map whose resolution is 8×8 may be directly determined as the second feature map corresponding to the path 4). Finally, four second feature maps are obtained on the four paths. Then, the path fusion module splices the second feature maps on the path 1 to the path 4 to obtain a saliency map of the to-be-processed image. In addition, it should be further understood that, when the first feature map is processed on each path in the path 1 to the path 4, the first feature map on each path has a corresponding weight, and when the path fusion module splices the second feature maps on the path 1 to the path 4, the second feature map obtained from each path also has a respective weight. The weights may be trained based on a function value of a loss function, to obtain new weights. The function value of the loss function may be reversely propagated in the architecture in FIG. 3, and the weights may be adjusted along a direction in which function values of the loss function are in descending order, until a global optimal solution is achieved (a final adjustment result may be that the function value of the loss function is minimum or the function value of the loss function is less than a specific threshold).

In addition, in the architecture shown in FIG. 3, after superposition processing is performed on at least two first feature maps on a specific path, a second feature map corresponding to the path is not directly obtained. Convolution processing and pooling processing are further performed on the feature map obtained after the superposition processing on the path, and then the second feature map corresponding to the path is obtained. Similarly, before splicing the second feature maps on the path 1 to the path 4, the path fusion module may further first perform convolution processing on the second feature maps on the path 1 to the path 4, and then splice the second feature maps on the path 1 to the path 4.

Figure 4:
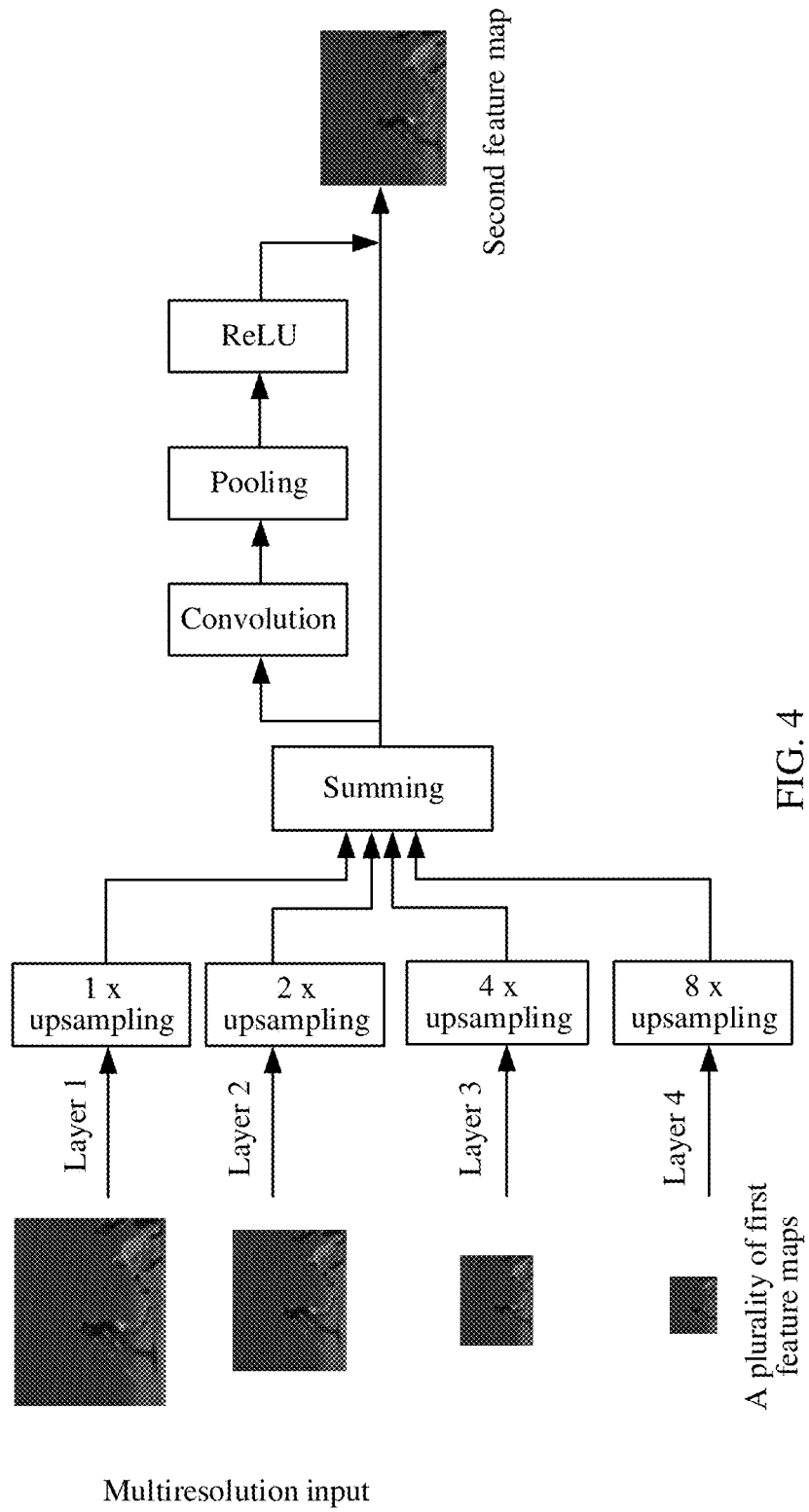
FIG. 4 is a schematic diagram of processing a first feature map.

It should be understood that, if a specific superposition set includes four first feature maps whose resolutions are respectively 64×64, 32×32, 16×16, and 8×8, processing the four first feature maps in the superposition set is equivalent to processing the four first feature maps whose resolutions are respectively 64×64, 32×32, 16×16, and 8×8 on the path 1 in FIG. 3. With reference to FIG. 4, the following describes in detail a process of processing the four first feature maps on the path 1.

As shown in FIG. 4, first feature maps at a layer 1 to a layer 4 are respectively obtained (resolutions of the first feature maps obtained at the layer 1 to the layer 4 are respectively 64×64, 32×32, 16×16, and 8×8). Upsampling processing is separately performed, based on the resolution 64×64, on first feature maps obtained at the layer 2 to the layer 4 (because a resolution of a first feature map obtained at the layer 1 is 64×64, the first feature map obtained at the layer 1 is no longer upsampled, but normal sampling may be directly performed on the first feature map obtained at the layer 1 to obtain a third feature map), and four third feature maps whose resolutions are all 64×64 are finally obtained. Then, the four third feature maps whose resolutions are all 64×64 are superposed, to obtain a fourth feature map. Finally, convolution processing and pooling processing are performed on the fourth feature map. In addition, an activation function such as a current linear rectification function or a rectified linear unit (ReLU) may be used to finely adjust an image obtained through the convolution processing and the pooling processing to finally obtain a second feature map corresponding to the path 1.

Optionally, performing convolution and splicing on the at least two second feature maps of the to-be-processed image to obtain the saliency map of the to-be-processed image includes upsampling the at least two second feature maps to obtain at least two fifth feature maps whose resolutions are the same, and performing convolution and splicing on the at least two fifth feature maps to obtain the saliency map of the to-be-processed image.

Table 1 shows a result of comparison between detection data in the method for detecting a salient object in an image in this embodiment of this application and detection data in other methods. "Ours" indicates the detection data in the method of this application. RC[7], CHM[29], DSR[30], DRFI[22], MC[49], ELD[12], MDF[27], DS[12], RFCN [45], DHS[34], and DCL[28] correspond to the detection data in the other methods. In addition, a larger $F_\beta$ value and a smaller mean squared error (MSE) value indicate better algorithm performance. It can be learned from the data in Table 1 that $F_\beta$ values in the method in this embodiment of this application are basically larger than $F_\beta$ values in the other methods, and MAE values in the method in this embodiment of this application are basically less than MAE values in the other methods. Therefore, a better effect is achieved in the method in this embodiment of this application.

TABLE 1

| Data Method | MSRA-B[35] | | ECCSD[48] | | HKU-IS[27] | | ECCSD[32] | | SOD[37, 38] | |
|---|---|---|---|---|---|---|---|---|---|---|
| | $F_\beta$ | MAE | $F_\beta$ | MAE | $F_\beta$ | MAE | $F_\beta$ | MAE | $F_\beta$ | MAE |
| RC[7] | 0.817 | 0.138 | 0.741 | 0.187 | 0.726 | 0.165 | 0.640 | 0.225 | 0.657 | 0.242 |
| CHM[29] | 0.809 | 0.138 | 0.722 | 0.195 | 0.728 | 0.158 | 0.631 | 0.222 | 0.655 | 0.249 |
| DSR[30] | 0.812 | 0.119 | 0.737 | 0.173 | 0.735 | 0.140 | 0.646 | 0.204 | 0.655 | 0.234 |
| DRFI[22] | 0.855 | 0.119 | 0.787 | 0.166 | 0.783 | 0.143 | 0.679 | 0.221 | 0.712 | 0.215 |

TABLE 1-continued

| Data Method | MSRA-B[35] | | ECCSD[48] | | HKU-IS[27] | | ECCSD[32] | | SOD[37, 38] | |
|---|---|---|---|---|---|---|---|---|---|---|
| | $F_\beta$ | MAE | $F_\beta$ | MAE | $F_\beta$ | MAE | $F_\beta$ | MAE | $F_\beta$ | MAE |
| MC[49] | 0.872 | 0.062 | 0.822 | 0.107 | 0.781 | 0.098 | 0.721 | 0.147 | 0.708 | 0.184 |
| ELD[12] | 0.914 | 0.042 | 0.865 | 0.981 | 0.844 | 0.071 | 0.767 | 0.121 | 0.760 | 0.154 |
| MDF[27] | 0.885 | 0.104 | 0.833 | 0.108 | 0.860 | 0.129 | 0.764 | 0.145 | 0.785 | 0.155 |
| DS[12] | — | — | 0.810 | 0.160 | — | — | 0.818 | 0.170 | 0.781 | 0.150 |
| RFCN[45] | 0.926 | 0.062 | 0.898 | 0.097 | 0.895 | 0.079 | 0.827 | 0.118 | 0.805 | 0.161 |
| DHS[34] | — | — | 0.905 | 0.061 | 0.892 | 0.052 | 0.820 | 0.091 | 0.823 | 0.127 |
| DCL[28] | 0.916 | 0.047 | 0.898 | 0.071 | 0.907 | 0.048 | 0.822 | 0.108 | 0.823 | 0.126 |
| Ours | 0.926 | 0.032 | 0.913 | 0.057 | 0.913 | 0.040 | 0.831 | 0.083 | 0.842 | 0.121 |

Figure 5:
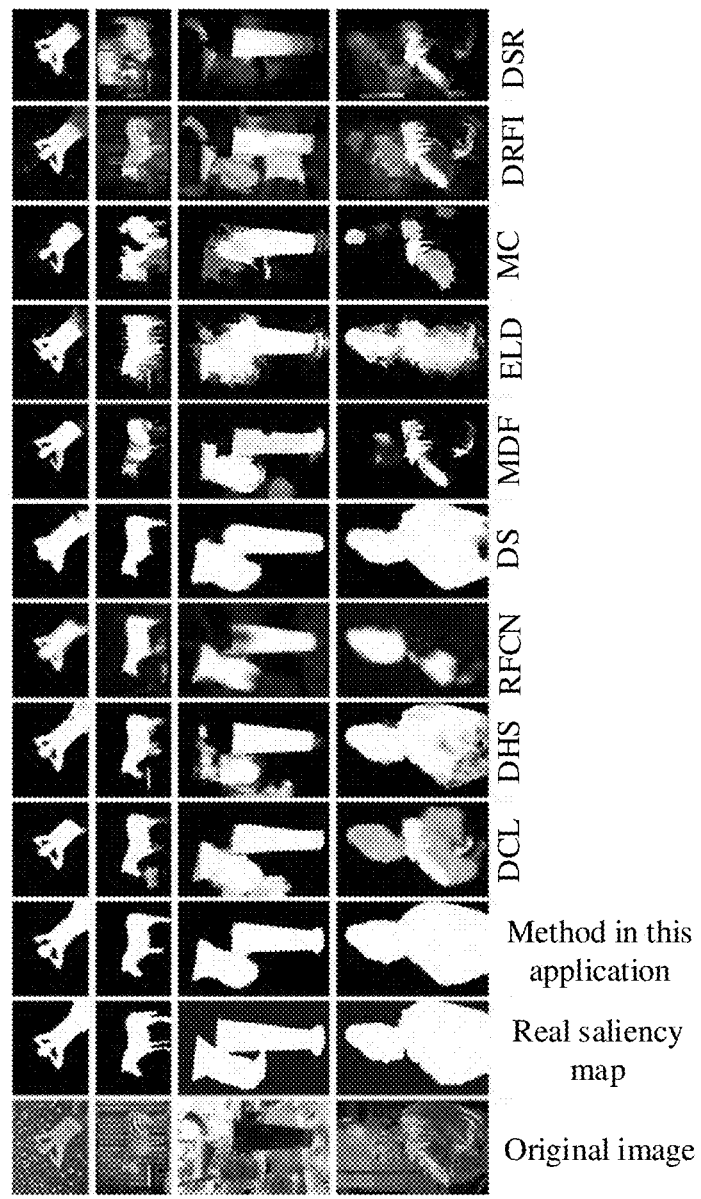
FIG. 5 is a diagram of comparison between a saliency map obtained in an embodiment of this application and a saliency map obtained in another method.

In addition, FIG. 5 shows a result of comparison between the saliency map obtained by processing the original image according to the method for detecting a salient object in an image in this embodiment of this application and saliency maps obtained by processing an original image according to other methods. DCL, DHS, RFCN, DS, MDF, ELD, MC, DRFI, and DSR correspond to the saliency maps obtained by processing the original image according to the other methods. It can be learned from FIG. 5 that, compared with the other methods, the saliency map obtained in the method in this application is closer to a real saliency map (the real saliency map may be obtained through human annotation). Therefore, the saliency map obtained in the method in this application has a better effect.

After the saliency map of the to-be-processed image is obtained, a segmented image of the to-be-processed image may be further obtained with reference to the to-be-processed image and the saliency map of the to-be-processed image. Guided filtering may be performed on the saliency map of the to-be-processed image based on the to-be-processed image to obtain the segmented image of the to-be-processed image. It should be understood that the segmented image of the to-be-processed image may also be considered as a type of saliency distribution map.

An image segmentation edge in the saliency map of the to-be-processed image can be further optimized through guided filtering, thereby obtaining a segmented image with a better effect.

In addition, it is assumed that the saliency map of the to-be-processed image is a first saliency map, and a resolution of the first saliency map is lower than the resolution of the to-be-processed image. In this case, the first saliency map may be first upsampled to obtain a second saliency map whose resolution is the same as that of the to-be-processed image. Then, guided filtering is performed on the second saliency map based on the to-be-processed image, to obtain the segmented image of the to-be-processed image.

For example, if a resolution of the saliency map of the to-be-processed image is 64×64 and the resolution of the to-be-processed image is 256×256, the resolution of the saliency map of the to-be-processed image may be first adjusted to 256×256, and then guided filtering is performed on the saliency map of the to-be-processed image based on the to-be-processed image, to obtain the segmented image of the to-be-processed image.

Figure 6:
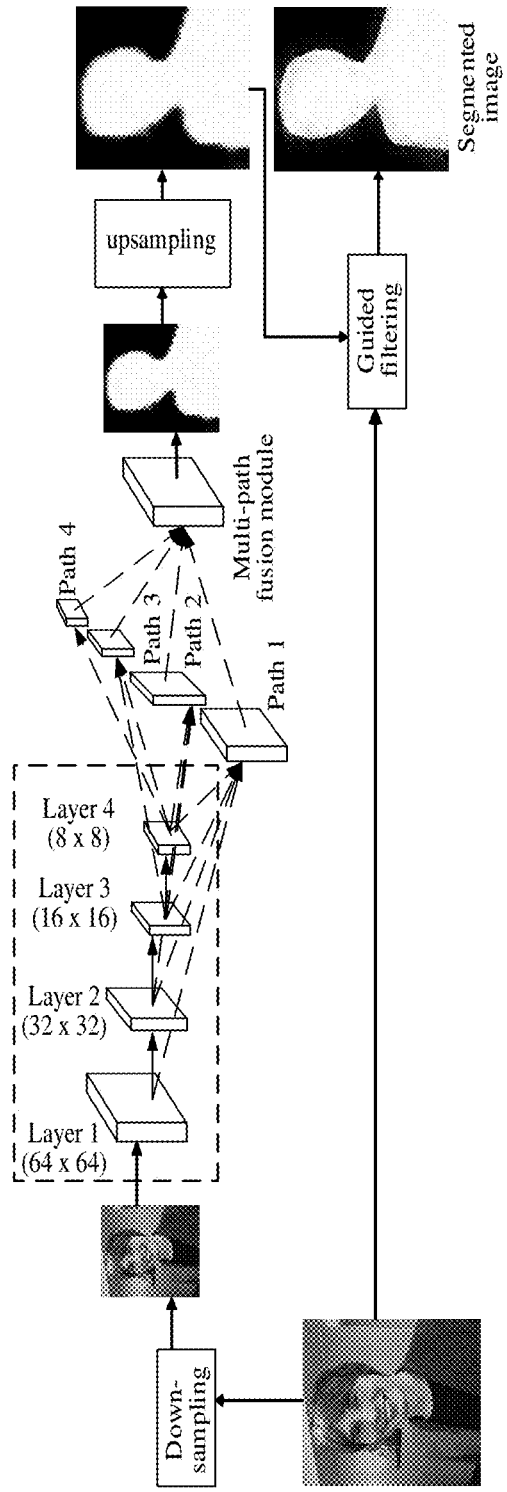
FIG. 6 is a schematic diagram of a method for detecting a salient object in an image according to an embodiment of this application.

FIG. 6 is a schematic diagram of a method for detecting a salient object in an image according to an embodiment of this application. The method in FIG. 6 includes the following steps.

Step 310. Obtain an original image.

The original image herein may be a photo that includes a portrait, and the photo may be a photo obtained by taking a selfie using a mobile phone.

Step 320. Downsample the original image, and then output a saliency map with a low resolution using a trained convolutional neural network model.

For example, if a resolution of the original image is 256×256, the original image may be first upsampled to obtain an image whose resolution is 128×128.

It should be understood that the convolutional neural network model herein may be shown in FIG. 3. When the convolutional neural network model is trained, different datasets may be used according to different scenarios. For example, during portrait segmentation, a convolutional neural network model may be trained using a portrait segmentation dataset, and during vehicle segmentation, the convolutional neural network model may be trained using a vehicle segmentation dataset.

Step 330. Upsample the saliency map obtained in step 320 to obtain a saliency map whose size is the same as that of the original image.

For example, if a resolution of the original image is 256×256 and a resolution of the saliency map obtained in step 320 is 128×128, the resolution of the saliency map may be adjusted from 128×128 to 256×256 by upsampling.

Step 340. Guided filtering is performed, based on the original image, on the saliency map finally obtained in step 330 to obtain a segmented image of the to-be-processed image.

It should be understood that an image edge of the saliency map obtained in step 330 can be optimized using the guided filtering to obtain a segmented image with a better effect.

The segmented image of the original image may be obtained by performing the foregoing steps 310 to 340. Then, processing such as beautifying a portrait and highlighting a circle may be performed on the original image based on the segmented image of the original image to implement beautification processing of the original image and improve a display effect of the original image.

It should be understood that the method for detecting the salient object in the image in this embodiment of this application can implement segmentation of an object in an image in a plurality of scenarios, for example, can implement segmentation of an important target such as a person, a vehicle, or an animal in an image. Application of the method for detecting the salient object in the image in this embodiment of this application in two relatively common scenarios, namely, portrait segmentation and vehicle segmentation, is described in detail below with reference to Example 1 and Example 2.

Example 1: Portrait segmentation includes the following steps.

Step 410. Train a convolutional neural network model using a portrait segmentation dataset.

The convolutional neural network model may be shown in FIG. 3.

The portrait segmentation dataset includes a portrait picture (picture including a portrait) and a real saliency distribution map corresponding to the portrait picture. In addition, to improve a training effect, processing such as mirroring, rotation, and illumination changing may be further performed on the picture to avoid overfitting during convolutional neural network training.

Step 420. First downsample an input portrait picture $I_h$ to obtain a picture $I_l$ with a low resolution, process, using the trained convolutional neural network, the picture with the low resolution obtained by downsampling, and finally output a portrait segmented image $S_l$ with a low resolution.

The input portrait picture is first downsampled, thereby reducing an image resolution, and reducing complexity of subsequent image processing.

Step 430. Upsample the portrait segmented image $S_l$ to obtain a picture $S_h$ whose size is the same as that of the original portrait picture.

Step 440. Perform guided filtering on the picture $S_h$ based on the portrait picture $I_h$ to obtain a final portrait segmented image.

It is assumed that a guided filtering function is $f(.)$, and an output image after filtering is $\tilde{S}_h = f(I_h, S_h, r, eps)$, where r is a filtering radius, and eps is a smooth parameter. A portrait segmentation edge is further optimized using the guided filtering such that the edge of the portrait segmented image is clearer.

In the other approaches, during portrait segmentation, a portrait edge cannot be accurately attached, and erroneous detection or missed detection may occur in a local area in an image. However, in the method in this application, a portrait can be accurately located in a complex scenario, and an edge of the portrait can be relatively accurately attached, to achieve a better segmentation effect.

The input picture is first upsampled. An image with a lower resolution is obtained, and basic portrait segmentation is implemented on the image with the lower resolution. In addition, in the method in this application, a portrait in an image can be automatically detected without manual interaction, and the portrait segmentation is implemented.

Figure 7:
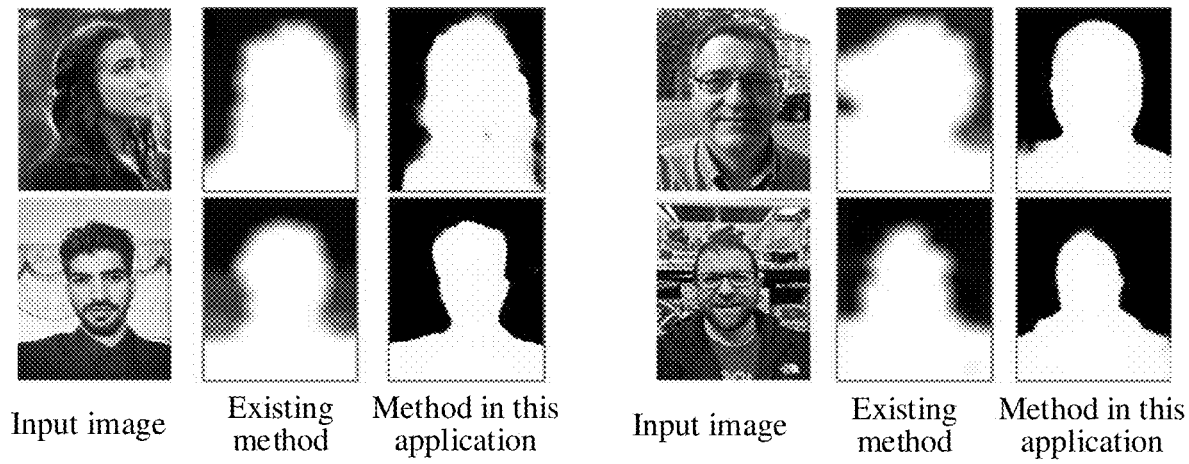
FIG. 7 is a diagram of comparison between a saliency map obtained in an embodiment of this application and a saliency map obtained in another method.

A result of comparison between the image segmentation in the method in this application and image segmentation in the other approaches is shown in FIG. 7. It can be learned from FIG. 7 that, compared with the existing method, in the method for detecting the salient object in the image in this embodiment of this application, an object region having a salient feature in the image can be accurately distinguished, an effect of saliency analysis is better.

Example 2: Vehicle segmentation includes the following steps.

Step 510. Train a convolutional neural network model using a vehicle segmentation dataset.

Step 520. First downsample an input road scene picture $I_h$ to obtain a picture $I_l$ with a low resolution, process, using the trained convolutional neural network, the picture with the low resolution obtained by downsampling, and finally output a vehicle segmented image $S_l$ with a low resolution.

Step 530. Upsample the vehicle segmented image $S_l$ to obtain a picture $S_h$ whose size is the same as that of the original road scene picture.

Step 540. Perform guided filtering on the picture $S_h$ based on the road scene picture $I_h$ to obtain a final vehicle segmented image.

It should be understood that the foregoing is merely two scenarios applied to the method for detecting the salient object in the image in the embodiments of this application. In essence, the method for detecting the salient object in the image in the embodiments of this application may also be applied to another scenario. Providing that training data in the scenario is used to train the convolutional neural network and corresponding processing is performed on the to-be-processed image, a better effect can also be achieved.

In the method in this application, the vehicle segmentation can be basically implemented on an image with a lower resolution, semantic accuracy can also be ensured in a complex and changeable background environment, and finally a detailing degree of an edge can be ensured by performing guided filtering on an image with a high resolution. Without manual interaction, a vehicle in an image can be automatically detected and segmented, and automatic driving can be assisted to decide. Compared with another existing method, in the present application, a vehicle edge can be effectively segmented, to improve a determining capability of estimating vehicle bit posture, a vehicle distance, and the like.

The following describes in detail a method for detecting a salient object in an image in an embodiment of this application with reference to FIG. 3 again.

The model shown in FIG. 3 is a basic network model based on a ResNet-101 architecture. In the network model, there are four layers in total, four paths (the paths herein are equivalent to the foregoing sets), and one multi-path fusion module. Resolutions corresponding to a layer 1 to a layer 4 are respectively 64×64, 32×32, 16×16, and 8×8. A feature map of at least one level of four levels is received on each of the four paths as an input. Feature maps of four levels (level 1 to level 4) are received on a path 1, feature maps of three levels (level 2 to level 4) are received on a path 2, feature maps of two layers (layer 3 and layer 4) are received on a path 4, and a feature map of one layer (layer 4) is received on a path 4.

It is assumed that a resolution of the to-be-processed image is 256×256. The following describes in detail specific operations of layers, paths, and the path fusion module in the network model shown in FIG. 3.

Step 610. Feature maps of corresponding resolutions are obtained from the to-be-processed image at the layer 1 to the layer 4.

Feature maps whose resolutions are 64×64, 32×32, 16×16, 8×8 are respectively obtained from the to-be-processed image at the layer 1 to the layer 4.

Step 620. Feature maps of at least one level are separately fused on the path 1 to path 4.

Using the path 1 as an example, feature maps of a layer 1 to a layer 4 are received on a path 1, and the feature maps on the layer 1 to the layer 4 are upsampled, to obtain four images whose resolutions are the same. Then, the four images with the same resolution are fused, a fused feature map is obtained, convolution processing and pooling processing are performed on the fused feature map. Finally, a feature map after the convolution processing and the pooling processing is finely adjusted using a linear rectification function, to finally obtain a feature map on the path 1.

Step 630. The multi-path fusion module fuses the feature maps on the path 1 to the path 4.

The multi-path fusion module upsamples the feature maps on the path 1 to the path 4, to obtain four feature maps whose resolutions are all 64×64, performs a convolution operation and a splicing operation on the four feature maps, and upsamples a feature map obtained through the convolution operation and the splicing operation to a size of the to-be-processed image (a resolution is 128×128) to obtain a saliency map of the to-be-processed image.

It should be understood that the network architecture shown in FIG. 3 is merely a possible architecture of the method in the embodiments of this application. Actually, several improvements and replacements may be further made based on the network architecture shown in FIG. 3. For example, a quantity of convolutional layers and a quantity of paths are changed, a correspondence between a path and a convolutional layer is changed, and the like. Network architectures obtained through improvement and replacement shall fall within the protection scope of this application.

The method for detecting the salient object in the image in the embodiments of this application may be applied to segmenting an important target in a picture. For example, in a portrait mode, a portrait and a background object in a picture are segmented from each other, and different processing is performed on the portrait and the background (for example, face beautification processing is performed on the portrait, blurring processing is performed on the background, a color of the background is enhanced, and a dark area is compressed at four corners of the background), thereby achieving an artistic effect of highlighting and beautifying a portrait. In the method in this embodiment of this application, a self-portrait effect and a wide aperture effect in the portrait mode may be applied. The method in this embodiment of this application may be further applied to portrait stylization, portrait beautification, portrait background editing and composition (for example, generation of an identification photo, and composition of a group photo at a scenic spot). After saliency analysis is performed on an original picture, a saliency map of the original picture is obtained. Then, stylization processing may be performed on the portrait in the original picture based on the saliency map obtained through analysis, or beautification processing may be performed on the portrait, or the background in the original picture is replaced.

Optionally, the method in this embodiment of this application may be further applied to segmenting and recognizing an object of interest in the image, and the like.

The foregoing describes in detail the method for detecting the salient object in the image in the embodiments of this application with reference to FIG. 2 to FIG. 7. The following describes an apparatus for detecting a salient object in an image in an embodiment of this application with reference to FIG. 8 and FIG. 9. It should be understood that, the apparatuses in FIG. 8 and FIG. 9 can perform corresponding steps of the foregoing method for detecting the salient object in the image. For brevity, repeated descriptions are appropriately omitted below.

Figure 8:
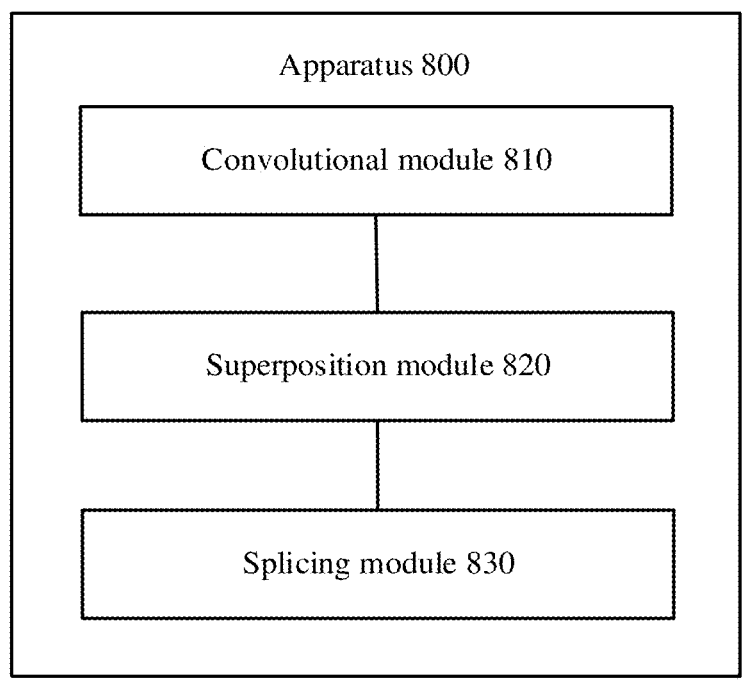
FIG. 8 is a schematic block diagram of an apparatus for detecting a salient object in an image according to an embodiment of this application.

FIG. 8 is a schematic block diagram of an apparatus for detecting a salient object in an image according to an embodiment of this application. An apparatus 800 in FIG. 8 includes a convolution module 810 configured to separately perform convolution processing corresponding to at least two convolutional layers on a to-be-processed image to obtain at least two first feature maps of the to-be-processed image, where resolutions of the at least two first feature maps are lower than a resolution of the to-be-processed image, and resolutions of any two of the at least two first feature maps are different, a superposition module 820 configured to perform superposition processing on at least two first feature maps included in a superposition set in at least two sets to obtain at least two second feature maps of the to-be-processed image, where the at least two sets are respectively corresponding to different resolutions, the at least two sets are in a one-to-one correspondence with the at least two second feature maps, and a resolution of a first feature map included in the superposition set is lower than or equal to a resolution of a second feature map corresponding to the superposition set, and a splicing module 830 configured to splice the at least two second feature maps to obtain a saliency map of the to-be-processed image.

Optionally, in an embodiment, the superposition module 820 is configured to upsample a first feature map, in the superposition set, whose resolution is lower than the resolution of the second feature map corresponding to the superposition set, to obtain at least two third feature maps whose resolutions are the same as the resolution of the second feature map corresponding to the superposition set, where the at least two third feature maps are in a one-to-one correspondence with the at least two first feature maps, and superpose the at least two third feature maps to obtain the second feature map corresponding to the superposition set.

Optionally, in an embodiment, the superposition module 820 is configured to superpose the at least two third feature maps based on a weight corresponding to each of the at least two third feature maps to obtain the second feature map.

Optionally, in an embodiment, the weight of each of at least one third feature map is obtained by training based on a difference between a saliency map of a training image and a reference saliency map corresponding to the training image.

Optionally, in an embodiment, the splicing module 830 is configured to splice the at least two second feature maps based on a weight corresponding to each of the at least two second feature maps to obtain the saliency map of the to-be-processed image.

Optionally, in an embodiment, the weight of each of the at least two second feature maps is determined based on a difference between a saliency map of a training image and a reference saliency map corresponding to the training image.

Optionally, in an embodiment, the superposition module 820 is configured to perform superposition processing on the at least two first feature maps included in the superposition set in the at least two sets, perform convolution processing on at least two feature maps obtained after the superposition processing to obtain at least two feature maps on which convolution processing is performed, where the convolution processing is used to extract features of the at least two feature maps obtained after the superposition processing, and perform pooling processing on the at least two feature maps obtained through the convolution processing to obtain the at least two second feature maps.

Optionally, in an embodiment, the splicing module 830 is configured to perform convolution processing on the at least two second feature maps to obtain features of the at least two second feature maps, and splice the features of the at least two second feature maps to obtain the saliency map of the to-be-processed image.

Optionally, in an embodiment, the apparatus 800 further includes a filtering module (not shown) configured to perform guided filtering on the saliency map of the to-be-processed image based on the to-be-processed image to obtain a segmented image of the to-be-processed image.

Optionally, in an embodiment, the saliency map is a first saliency map, a resolution of the first saliency map is lower than the resolution of the to-be-processed image, and the filtering module is configured to upsample the first saliency map to obtain a second saliency map whose resolution is the same as the resolution of the to-be-processed image, and perform guided filtering on the second saliency map based on the to-be-processed image to obtain the segmented image of the to-be-processed image.

Figure 9:
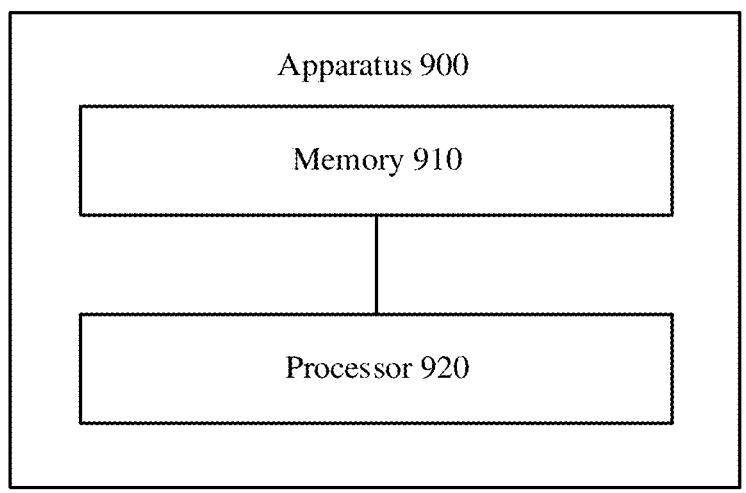
FIG. 9 is a schematic block diagram of an apparatus for detecting a salient object in an image according to an embodiment of this application.

FIG. 9 is a schematic block diagram of an apparatus for detecting a salient object in an image according to an embodiment of this application. An apparatus 900 in FIG. 9 includes a memory 910 configured to store a program, and a processor 920 configured to execute the program stored in the memory 910. When the program of the memory 910 is executed, the processor 920 is configured to separately perform convolution processing corresponding to at least two convolutional layers on a to-be-processed image to obtain at least two first feature maps of the to-be-processed image, where resolutions of the at least two first feature maps are lower than a resolution of the to-be-processed image, and resolutions of any two of the at least two first feature maps are different, perform superposition processing on at least two first feature maps included in a superposition set in at least two sets to obtain at least two second feature maps of the to-be-processed image, where the at least two sets are respectively corresponding to different resolutions, the at least two sets are in a one-to-one correspondence with the at least two second feature maps, and a resolution of a first feature map included in the superposition set is lower than or equal to a resolution of a second feature map corresponding to the superposition set, and splice the at least two second feature maps to obtain a saliency map of the to-be-processed image.

Optionally, in an embodiment, the processor 920 is configured to upsample a first feature map, in the superposition set, whose resolution is lower than the resolution of the second feature map corresponding to the superposition set to obtain at least two third feature maps whose resolutions are the same as the resolution of the second feature map corresponding to the superposition set, where the at least two third feature maps are in a one-to-one correspondence with the at least two first feature maps, and superpose the at least two third feature maps to obtain the second feature map corresponding to the superposition set.

Optionally, in an embodiment, the processor 920 is configured to superpose the at least two third feature maps based on a weight corresponding to each of the at least two third feature maps, to obtain the second feature map.

Optionally, in an embodiment, the weight of each of at least one third feature map is obtained by training based on a difference between a saliency map of a training image and a reference saliency map corresponding to the training image.

Optionally, in an embodiment, the processor 920 is configured to splice the at least two second feature maps based on a weight corresponding to each of the at least two second feature maps, to obtain the saliency map of the to-be-processed image.

Optionally, in an embodiment, the weight of each of the at least two second feature maps is determined based on a difference between a saliency map of a training image and a reference saliency map corresponding to the training image.

Optionally, in an embodiment, the processor 920 is configured to perform superposition processing on the at least two first feature maps included in the superposition set in the at least two sets, perform convolution processing on at least two feature maps obtained after the superposition processing to obtain at least two feature maps on which convolution processing is performed, where the convolution processing is used to extract features of the at least two feature maps obtained after the superposition processing, and perform pooling processing on the at least two feature maps obtained through the convolution processing to obtain the at least two second feature maps.

Optionally, in an embodiment, the processor 920 is configured to perform convolution processing on the at least two second feature maps, to obtain features of the at least two second feature maps, and splice the features of the at least two second feature maps to obtain the saliency map of the to-be-processed image.

Optionally, in an embodiment, the processor 920 is further configured to perform guided filtering on the saliency map of the to-be-processed image based on the to-be-processed image, to obtain a segmented image of the to-be-processed image.

Optionally, in an embodiment, the saliency map is a first saliency map, a resolution of the first saliency map is lower than the resolution of the to-be-processed image, and the processor 920 is configured to upsample the first saliency map to obtain a second saliency map whose resolution is the same as the resolution of the to-be-processed image, and perform guided filtering on the second saliency map based on the to-be-processed image to obtain the segmented image of the to-be-processed image.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on a particular application and a design constraint of a technical solution. A person skilled in the art may use different methods to implement the described functions for each particular application, but it should not be considered that the implementation goes beyond the scope of this application.

It may be clearly understood by the person skilled in the art that, for convenience and brevity of description, for specific working processes of the system, apparatus, and unit described in the foregoing, refer to corresponding processes in the foregoing method embodiments. Details are not described herein again.

In the several embodiments provided in this application, it should be understood that the disclosed system, apparatus, and method may be implemented in another manner. For example, the described apparatus embodiment is merely an example. For example, the unit division is merely logical function division and may be other division in actual implementation. For example, at least two units or components may be combined or integrated into another system, or some features may be ignored or may not be performed. In addition, the displayed or discussed mutual couplings or direct couplings or communication connection may be implemented through some interfaces. The indirect couplings or communication connection between the apparatuses or units may be implemented in electronic, mechanical, or other forms.

The units described as separate parts may or may not be physically separate, and parts displayed as units may or may not be physical units, may be located in one position, or may be distributed on at least two network units. Some or all of the units may be selected based on actual requirements to achieve the objective of the solution in the embodiment.

In addition, functional units in the embodiments of this application may be integrated into one processing unit, or each of the units may exist alone physically, or at least two units are integrated into one unit.

When the functions are implemented in a form of a software function unit and sold or used as an independent product, the functions may be stored in a computer-readable storage medium. Based on such an understanding, the technical solutions of this application essentially, or the part contributing to the other approaches, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes various mediums that can store program code, such as a universal serial bus (USB) flash drive, a removable hard disk, a read-only memory (ROM), a random access memory (RAM), a magnetic disk, and an optical disc.

The foregoing descriptions are merely specific implementations of this application, but the protection scope of this application is not limited thereto. Any variation or replacement readily figured out by the person skilled in the art within the technical scope disclosed in this application shall fall within the protection scope of this application. Therefore, the protection scope of this application shall be subject to the protection scope of the claims.

What is claimed is:

1. A method for detecting a salient object in an image, comprising:
   separately performing a first convolution processing corresponding to at least two convolutional layers on the image to obtain at least two first feature maps of the image, wherein resolutions of the at least two first feature maps are lower than a resolution of the image, and wherein a resolution of each of the at least two first feature maps is different;
   processing the at least two first feature maps to obtain at least two second feature maps of the image, wherein the at least two second feature maps are obtained by performing a first superposition processing on a part or all of the at least two first feature maps, wherein a resolution of each of the at least two second feature maps is different, and wherein the resolution of each of the at least two second feature maps is higher than or equal to a maximum resolution in the part or all of the at least two first feature maps; and
   splicing the at least two second feature maps based on a third weight corresponding to each of the at least two second feature maps to obtain a saliency map of the image, wherein the third weight is based on a difference between a saliency map of a training image and a reference saliency map corresponding to the training image.

2. The method of claim 1, wherein performing the first superposition processing on the part or all of the at least two first feature maps comprises:
   upsampling a first feature map of the at least two first feature maps, in the part or all of the at least two first feature maps, to obtain a third feature map corresponding to the first feature map, wherein a resolution of the first feature map is lower than the resolution of the at least one second feature map, and wherein a resolution of the third feature map is equal to the resolution of the at least one second feature map; and
   performing a second superposition processing on the third feature map and a second first feature map, in the part or all of the at least two first feature maps and on which upsampling is not performed, to obtain the at least one second feature map.

3. The method of claim 2, wherein performing the second superposition processing on the third feature map and the second first feature map comprises:
   obtaining a first weight corresponding to the second first feature map and a second weight corresponding to the third feature map; and
   performing, based on the first weight or the second weight, a third superposition processing on the third feature map and the second first feature map to obtain the at least one second feature map.

4. The method of claim 3, wherein the first weight or the second weight is obtained by training based on a difference between a saliency map of a training image and a reference saliency map corresponding to the training image.

5. The method of claim 2, wherein performing the second superposition processing on the third feature map and the second first feature map comprises performing superposition, convolution, and pooling processing on the third feature map and the second first feature map to obtain the at least one second feature map.

6. The method of claim 1, wherein splicing the at least two second feature maps comprises:
   performing a second convolution processing on the at least two second feature maps to obtain features of the at least two second feature maps; and
   splicing the features to obtain the saliency map of the image.

7. The method of claim 1, further comprising performing a first guided filtering on the saliency map of the image based on the image to obtain a segmented image of the image.

8. The method of claim 7, wherein the saliency map is a first saliency map, wherein a resolution of the first saliency map is lower than the resolution of the image, and wherein performing the first guided filtering on the saliency map of the image comprises:
   upsampling the first saliency map to obtain a second saliency map, wherein a resolution of the second saliency map is the same as the resolution of the image; and
   performing a second guided filtering on the second saliency map based on the image to obtain the segmented image.

9. An apparatus for detecting a salient object in an image, comprising:
   a memory comprising instructions; and
   a processor coupled to the memory, wherein the instructions cause the processor to be configured to:
     separately perform a first convolution processing corresponding to at least two convolutional layers on the image to obtain at least two first feature maps of the image, wherein resolutions of the at least two first feature maps are lower than a resolution of the image, and wherein a resolution of each of the at least two first feature maps is different;
     process the at least two first feature maps to obtain at least two second feature maps of the image, wherein the at least two second feature maps are obtained by performing a first superposition processing on a part or all of the at least two first feature maps, wherein a resolution of each of the at least two second feature maps is different, and wherein the resolution of each of the at least two second feature maps is higher than or equal to a maximum resolution in the part or all of the at least two first feature maps; and
     splice the at least two second feature maps based on a third weight corresponding to each of the at least two second feature maps to obtain a saliency map of the image, wherein the third weight is based on a difference between a saliency map of a training image and a reference saliency map corresponding to the training image.

10. The apparatus of claim 9, wherein the instructions further cause the processor to be configured to:
   upsample a first feature map of the at least two first feature maps, in the part or all of the at least two first feature maps, to obtain a third feature map corresponding to the first feature map, wherein a resolution of the first feature map is lower than the resolution of the at least one second feature map, and wherein a resolution of the third feature map is equal to the resolution of the at least one second feature map; and
   perform a second superposition processing on the third feature map and a second first feature map, in the part or all of the at least two first feature maps and on which upsampling is not performed, to obtain the at least one second feature map.

11. The apparatus of claim 10, wherein the instructions further cause the processor to be configured to:
   obtain a first weight corresponding to the second first feature map and a second weight corresponding to the third feature map; and
   perform, based on the first weight or the second weight, a third superposition processing on the third feature map and the second first feature map to obtain the at least one second feature map.

12. The apparatus of claim 11, wherein the first weight or the second weight is obtained by training based on a difference between a saliency map of a training image and a reference saliency map corresponding to the training image.

13. The apparatus of claim 10, wherein the instructions further cause the processor to be configured to perform superposition, convolution, and pooling processing on the third feature map and the second first feature map to obtain the at least one second feature map.

14. The apparatus of claim 9, wherein the instructions further cause the processor to be configured to:
   perform a second convolution processing on the at least two second feature maps to obtain features of the at least two second feature maps; and
   splice the features to obtain the saliency map of the image.

15. The apparatus of claim 9, wherein the instructions further cause the processor to be configured to perform a first guided filtering on the saliency map of the image based on the image to obtain a segmented image of the image.

16. The apparatus of claim 15, wherein the saliency map is a first saliency map, wherein a resolution of the first saliency map is lower than the resolution of the image, and wherein the instructions further cause the processor to be configured to:
   upsample the first saliency map to obtain a second saliency map, wherein a resolution of the second saliency map is the same as the resolution of the image; and
   perform a second guided filtering on the second saliency map based on the image to obtain the segmented image.

* * * * *